United States Patent [19]

Shenberger et al.

[11] Patent Number: 4,505,197

[45] Date of Patent: Mar. 19, 1985

[54] TWINE CUT AND CLAMP MECHANISM FOR A ROLL BALING MACHINE

[75] Inventors: Paul S. Shenberger, Wyomissing Hills; James D. Walker, Lancaster; Willis R. Campbell, Ephrata, all of Pa.

[73] Assignee: Sperry Corporation, New Holland, Pa.

[21] Appl. No.: 600,745

[22] Filed: Apr. 16, 1984

[51] Int. Cl.³ .............................................. B65B 13/18
[52] U.S. Cl. ............................................ 100/5; 100/88
[58] Field of Search ................. 100/5, 13, 88; 56/341

[56] References Cited

U.S. PATENT DOCUMENTS

| | | | |
|---|---|---|---|
| 3,884,138 | 5/1975 | Rice | 100/5 |
| 3,913,473 | 10/1975 | Meiers | 100/5 |
| 3,988,977 | 11/1976 | Anderson | 100/5 |
| 4,072,095 | 2/1978 | Campbell | 100/5 |
| 4,094,239 | 6/1978 | Murr | 100/5 |
| 4,133,258 | 1/1979 | Popiolek | 100/5 |
| 4,169,410 | 10/1979 | Richardson | 100/5 |
| 4,182,235 | 1/1980 | Harig | 100/5 |
| 4,253,387 | 3/1981 | Schmitt | 100/5 |
| 4,306,494 | 12/1981 | Nishibe | 100/5 |

Primary Examiner—Billy J. Wilhite
Attorney, Agent, or Firm—Darrell F. Marquette; Frank A. Seemar; Larry W. Miller

[57] ABSTRACT

A twine cut and clamp mechanism for a roll baling machine includes a pair of arms and a pair of intermeshing spur gears connected, respectively, to the arms. A lever is connected to one of the arms to pivot it. The spur gears cause concurrent pivoting of the other arm when the one arm is pivoted by the lever.

5 Claims, 13 Drawing Figures

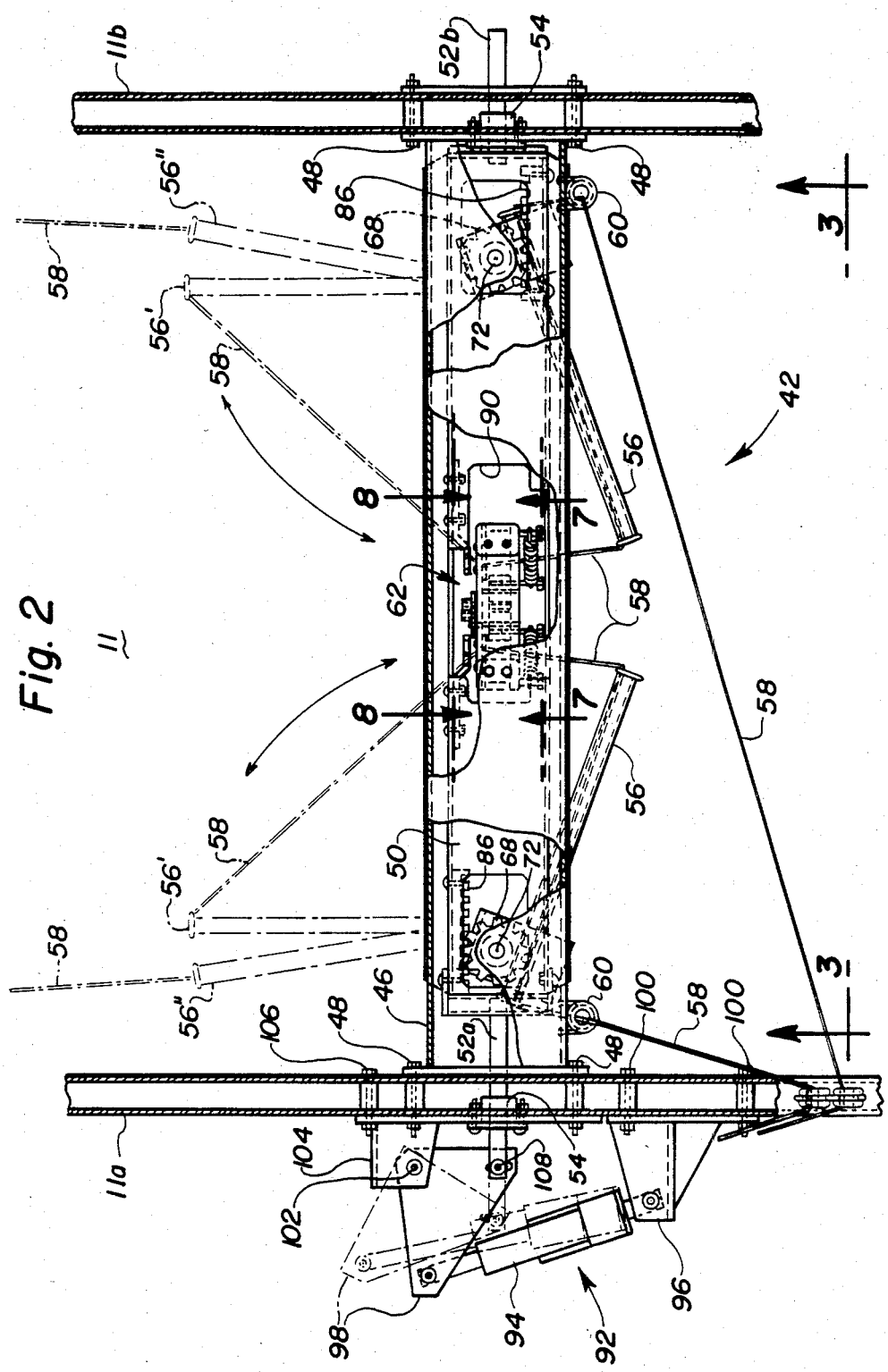

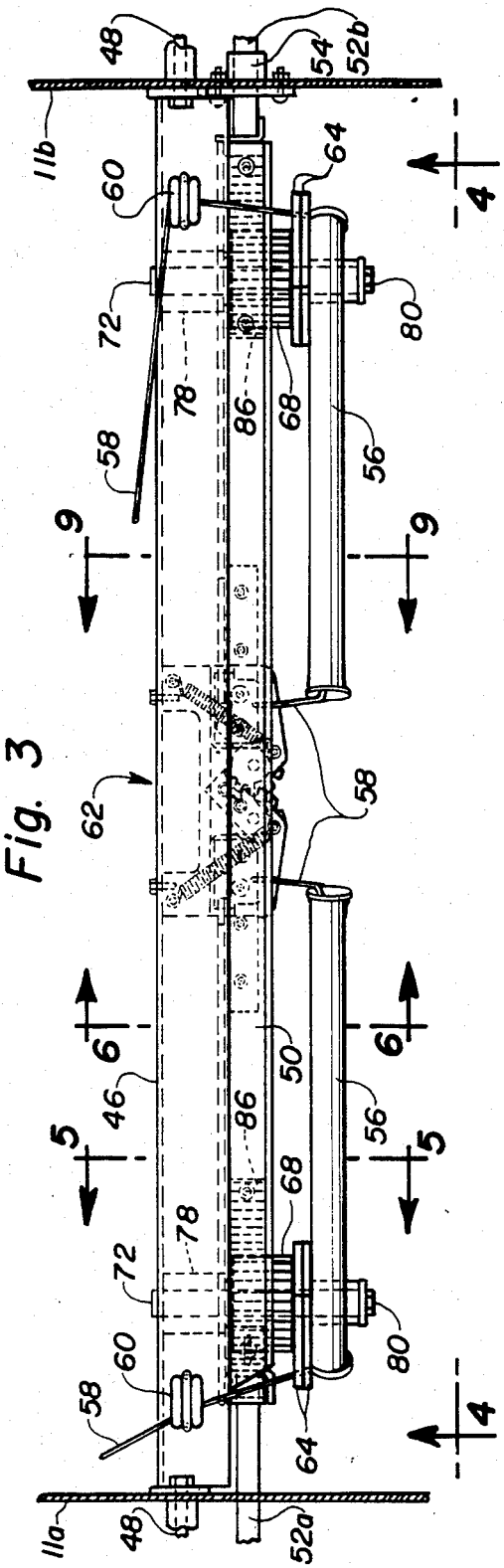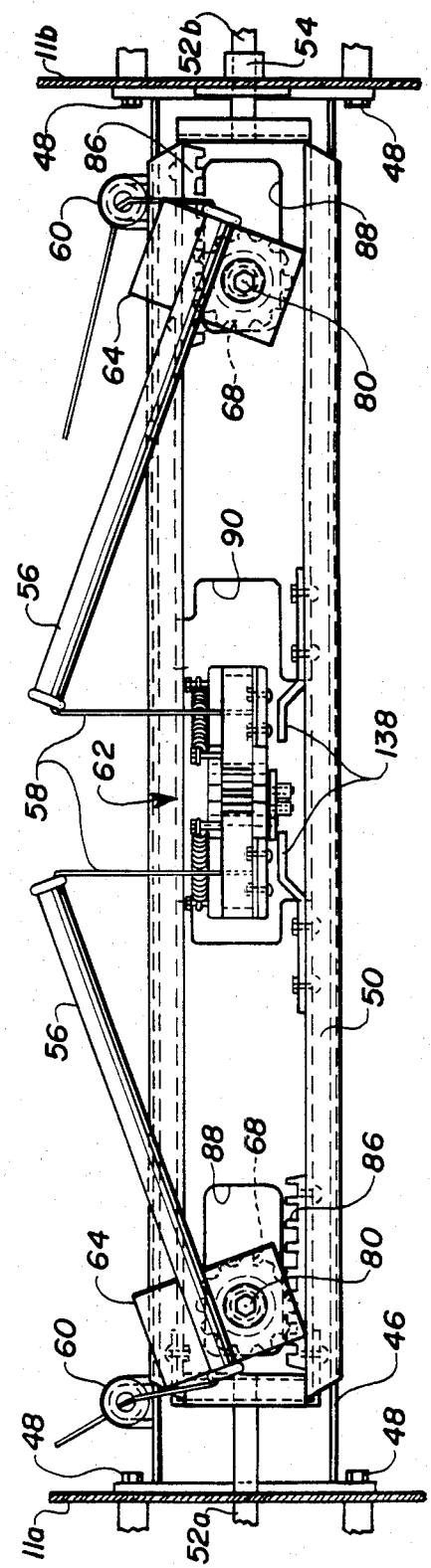

TWINE CUT AND CLAMP MECHANISM FOR A ROLL BALING MACHINE

BACKGROUND OF THE INVENTION

This invention relates generally to roll baling machines typically referred to as round balers which form cylindrical roll bales of crop material. In particular, this invention relates to a twine cut and clamp mechanism for such roll baling machines.

U.S. Pat. No. 4,169,410 discloses a twine severing mechanism including a pair of cutting blades movable into and out of engagement with a pair of striker plates to cut twine. The cutting blades are mounted on an elongated rod, and their movement is controlled by a pair of control rods which are connected to a pair of latch plates. When the control rods are displaced, substantially simultaneous movement of the cutting blades is effected due to the elongated rod and the latch plates. A disadvantage of this twine severing mechanism is that it is rather complex and thus difficult to assemble.

SUMMARY OF THE INVENTION

The present invention is directed to a twine cut and clamp mechanism for use in a roll baling machine having means for wrapping a roll bale with twine. The mechanism includes first and second arms each having one edge adapted for cutting twine and another edge adapted for clamping twine. First and second spur gears are connected, respectively, to the first and second arms, and the first and second spur gears are in intermeshing engagement with each other. The mechanism also includes a lever connected to the first arm for pivoting the first arm. The first and second spur gears cause concurrent pivoting of the second arm when the first arm is pivoted by the lever.

BRIEF DESCRIPTION OF THE DRAWINGS

FIG. 2 is an enlarged sectional view taken on lines 2—2 of FIG. 1;

FIG. 3 is a view taken on lines 3—3 of FIG. 2;

FIG. 4 is a view taken on lines 4—4 of FIG. 3;

DESCRIPTION OF THE PREFERRED EMBODIMENT

Figure 1:
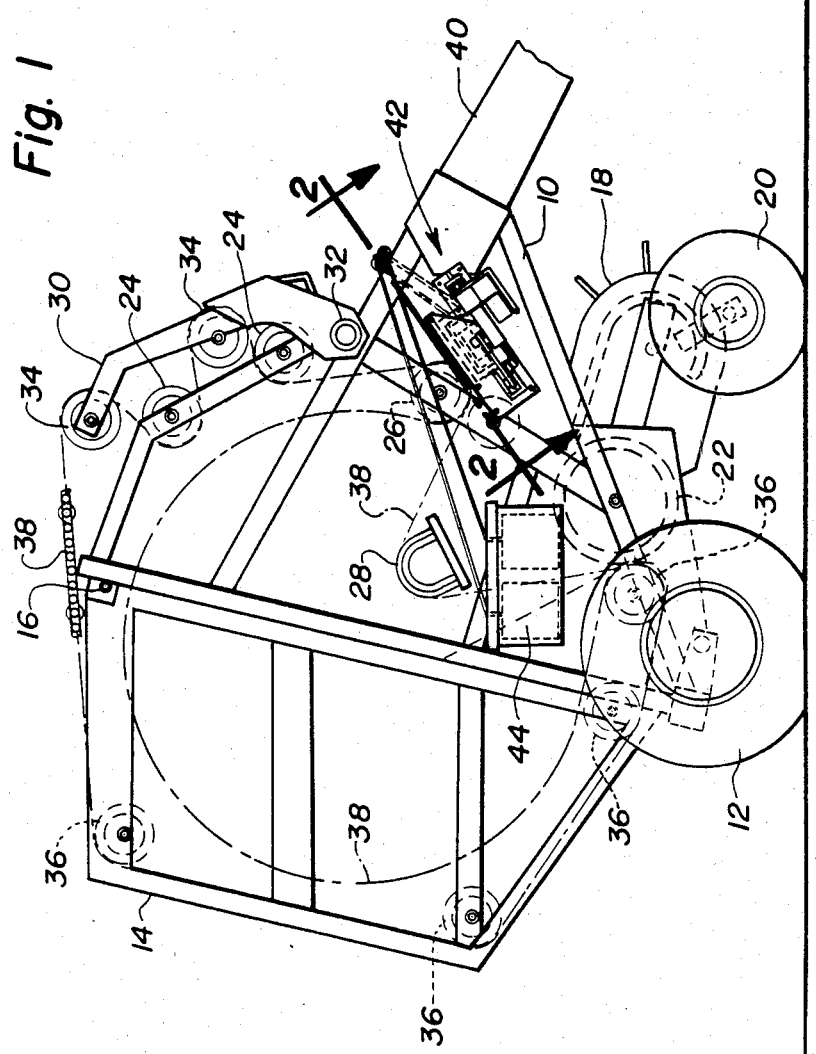
FIG. 1 is a side elevation view of a roll baling machine incorporating the preferred embodiment of the twine cut and clamp mechanism of the present invention.

Referring to FIG. 1, a roll baling machine incorporating the preferred embodiment of the present invention includes a base frame 10 supported by a pair of wheels 12, and a rear frame 14 pivotally connected at 16 to the base frame 10 by suitable bearings. A pickup unit 18 is mounted on the base frame 10 and is supported by wheels 20. A floor roller 22, guide members 24, and drive sprockets 26 are rotatably mounted on the base frame 10. Also, cam guide members 28 are supported on the base frame 10. An arm assembly 30 is rotatably mounted on the base frame 10 by a tube 32, and the arm assembly 30 carries guide members 34 which are rotatable. A plurality of guide members 36 are rotatably supported on the rear frame 14. A bale forming apron 38 is movably supported on the drive sprockets 26, the guide members 24, 34 and 36, and the cam guide members 28. The bale forming apron 38 is preferably comprised of a pair of endless link type chains connected at spaced intervals by transverse bars or slats. When the machine is empty, the apron 38 is supported on the cam guide members 28 to define a bale chamber having an initial wedge shape in side elevation. During bale formation, the apron 38 is lifted off the cam guide members 28 as the bale chamber expands to a generally cylindrical shape.

Figure 5:
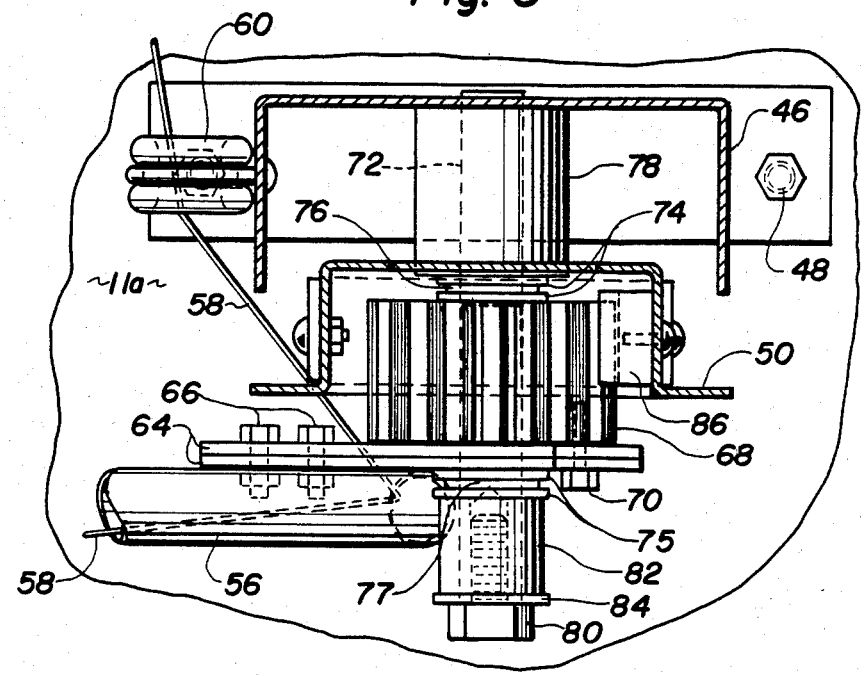
FIG. 5 is an enlarged sectional view taken on lines 5—5 of FIG. 3.

A twine wrapping apparatus 42 is supported on the base frame 10 and a twine box 44 is provided for supplying twine to the twine wrapping apparatus 42. As seen in FIGS. 2, 3, and 4, the twine wrapping apparatus 42 includes a support beam 46 which extends transversely between the side walls 11a, 11b of the base frame 10 and is connected thereto by bolts 48. As seen in FIG. 5, the beam 46 is of a generally inverted U-shaped cross section. The twine wrapping apparatus 42 also includes a shuttle member 50 which is supported at its ends by rods 52a, 52b slidably disposed in bearings 54 mounted in the side walls 11a, 11b for permitting movement of the shuttle member 50 generally transversely of the base frame 10 in the space 11 defined between the side walls 11a, 11b. As seen in FIG. 5, the shuttle member 50 is generally channel or top hat-shaped in cross section. Twine dispensing members such as twine tubes or arms 56 are rotatably supported on the support beam 46, and strands of twine 58 extend from the twine box 44 through twine guides 60 mounted on the support beam 46, then through the twine tubes 56 and into a cut and clamp mechanism 62 which is also supported on the support beam 46.

The twine tubes 56 are each welded to the lower one of a pair of plates 64 as seen in FIG. 5, and the plates 64 are connected to each other by bolts 66. The plates 64 are fixed to pinions 68 by bolts 70, only one bolt 70 being shown in FIG. 5. The pinions 68 are rotatably mounted on shafts 72 which are fixed at their upper ends to the support beam 46. A pair of washers 74 and a bearing member 76 are disposed between the upper side of each pinion 68 and a stabilizer block 78 which is positioned between the uppermost washer 74 and the support beam 46. Another pair of washers 75 and another bearing member 77 are disposed underneath the lowermost plate 64, and a bolt 80 is threaded into the bottom end of each shaft 72. A spacer collar 82 and a washer 84 are disposed between the lowermost washer 75 and the head of each bolt 80. When the bolts 80 are tightened into the shafts 72, the twine tubes 56 are, in effect, fixed to and will rotate with the pinions 68 as will be described later. The shuttle member 50 carries gear racks 86 which have teeth in intermeshing engagement with the teeth of the pinions 68. As seen in FIG. 4, openings 88 are provided in the top of the shuttle member 50 near the ends thereof to accommodate the stabilizer blocks 78, and another opening 90 is provided in the top of the shuttle member 50 near the center thereof to accommodate the cut and clamp mechanism 62.

Referring now to FIG. 2, the mechanism 92 for actuating the twine wrapping apparatus 42 includes a linear actuator 94 which is pivotably connected at one end to a bracket 96 and at the other end to a lever arm 98. The bracket 96 is secured to side wall 11a of the base frame 10 by bolts 100. The lever arm 98 is pivotably connected by a pin 102 to a bracket 104 which is fixed to the side wall 11a of the base frame 10 by two of the bolts 48 and by a further bolt 106. The lever arm 98 is also pivotably connected by a pin 108 to the end of the rod 52a which extends through the side wall 11a of the base frame 10. When the linear actuator 94 is extended as shown in FIG. 2, the lever arm 98 is pivoted on pin 102 from the position shown in full lines to the phantom position thereby moving the shuttle member 50 generally transversely toward the side wall 11a of the base frame 10. This causes the gear racks 86 on the shuttle member 50 to move in a direction which will cause concurrent rotation of the pinions 68 on the shafts 72 in opposite directions with respect to each other. Such rotation of the pinions 68 will cause simultaneous pivoting movement of the twine tubes 56 in opposite directions with respect to each other from their home or rest positions shown in full lines to their dispensing positions shown in phantom at 56″. Subsequent contraction of the linear actuator 94 will move the shuttle member 50 back toward the side wall 11b of the base frame 10 and thereby cause simultaneous pivoting movement of the twine tubes 56 back to their home or rest positions shown in full lines.

Figure 6:
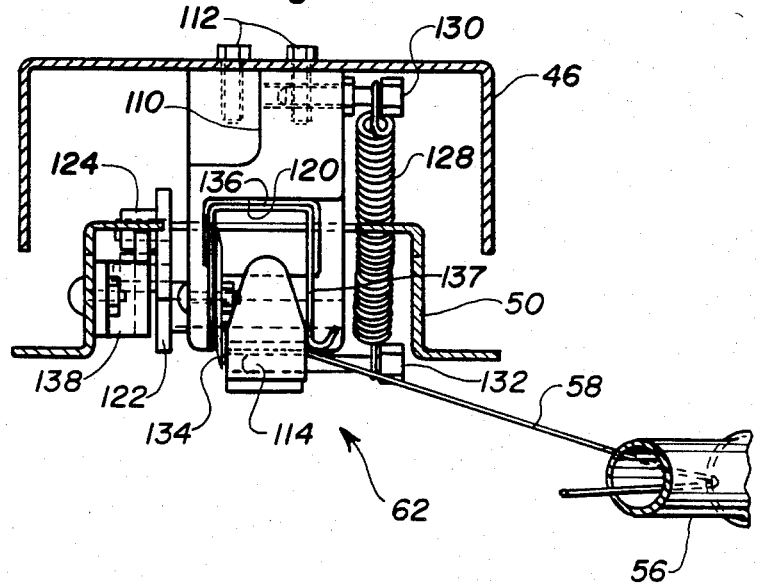
FIG. 6 is an enlarged sectional view taken on lines 6—6 of FIG. 3.
Figure 7:
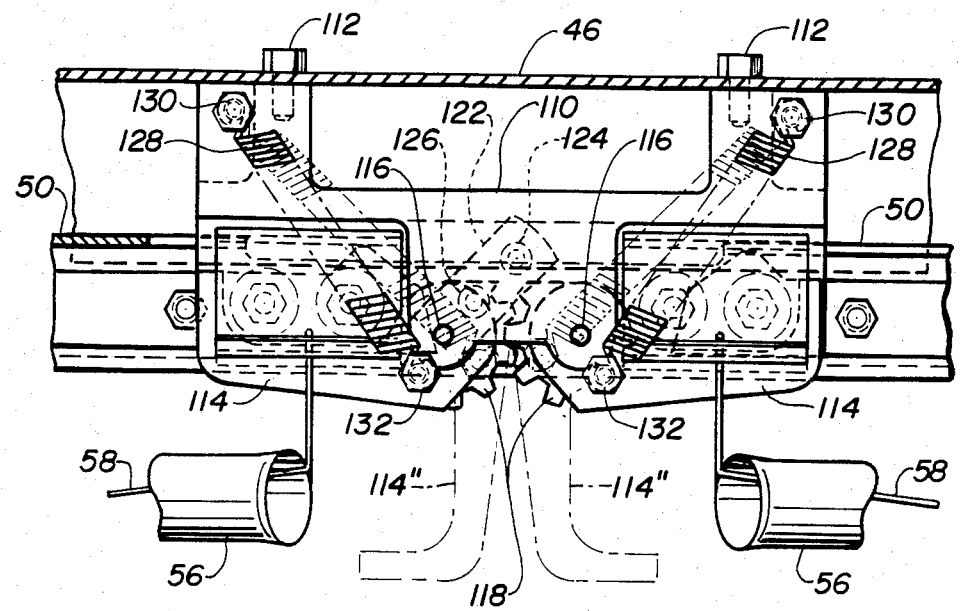
FIG. 7 is an enlarged sectional view taken on lines 7—7 of FIG. 2.
Figure 8:
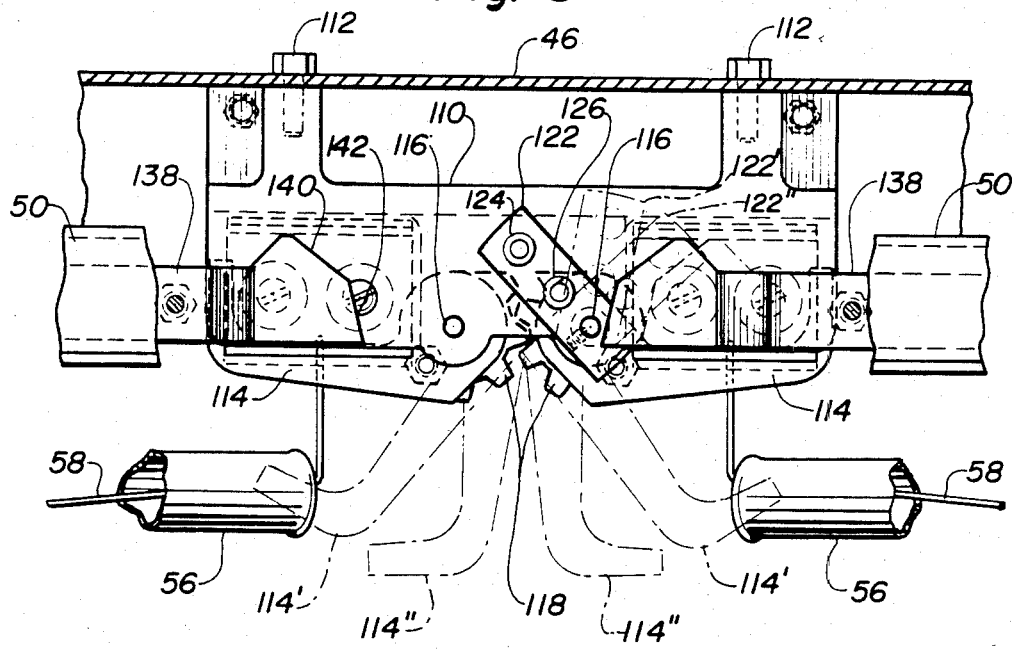
FIG. 8 is an enlarged sectional view taken on lines 8—8 of FIG. 2.

As seen in FIGS. 6, 7, and 8, the cut and clamp mechanism 62 of the present invention includes a body member 110 which is fastened to the support beam 46 by four bolts 112. A pair of arms 114 are mounted on pins 116 which are pivoted on the body member 110. Intermeshing spur gears 118 are fixed to the arms 114. Pockets 120 are provided in the bottom of the body member 110 to accommodate portions of the arms 114 when they are pivoted to the closed positions shown in full lines in FIG. 7 and 8. A lever 122 is fixed to one of the pins 116, and carries rollers 124 and 126. Tension springs 128 are connected between bolts 130 which are fastened to the body member 110 and bolts 132 which are connected to the arms 114. As best seen in FIG. 6, cutting members such as knives 134 and generally U-shaped spring clips 136 having resilient legs 137 are fastened to the body member 110 and are disposed in the pockets 120. A pair of cam members 138 are secured to the shuttle member 50. Each of the cam members 138 has a first cam surface 140 and a second cam surface 142 arranged for engaging the rollers 124 and 126, respectively, on the lever 122.

When the shuttle member 50 is moved toward the right in FIG. 8, the cam surface 140 on the left-hand cam member 138 engages the roller 124 on the lever 122 and pivots the lever 122 to the position shown in phantom at 122′. Further movement of the shuttle member 50 toward the right in FIG. 8 causes the cam surface 142 on the left-hand cam member 138 to engage the roller 126 on the lever 122 thereby pivoting the lever 122 to the position indicated in phantom at 122″. This pivoting movement of the lever 122 causes the intermeshing spur gears 118 to be rotated, resulting in concurrent pivoting movement of the arms 114 to their partially open positions shown in phantom at 114′ and finally to their fully open positions indicated in phantom at 114″. As the arms 114 are pivoted to their fully open positions 114″, the springs 128 seen in FIG. 7 will move slightly over center with respect to the pins 116 and will hold the arms 114 in that position. Subsequent opposite movement of the shuttle member 50 toward the left in FIG. 8 will result in the right-hand cam member 138 pivoting the arms 114 back toward their closed positions shown in full lines. As the arms 114 reach their partially open positions 114′, the springs 128 will move sufficiently back over center with respect to the pins 116 to quickly snap the arms 114 back into their closed positions.

Figure 9:
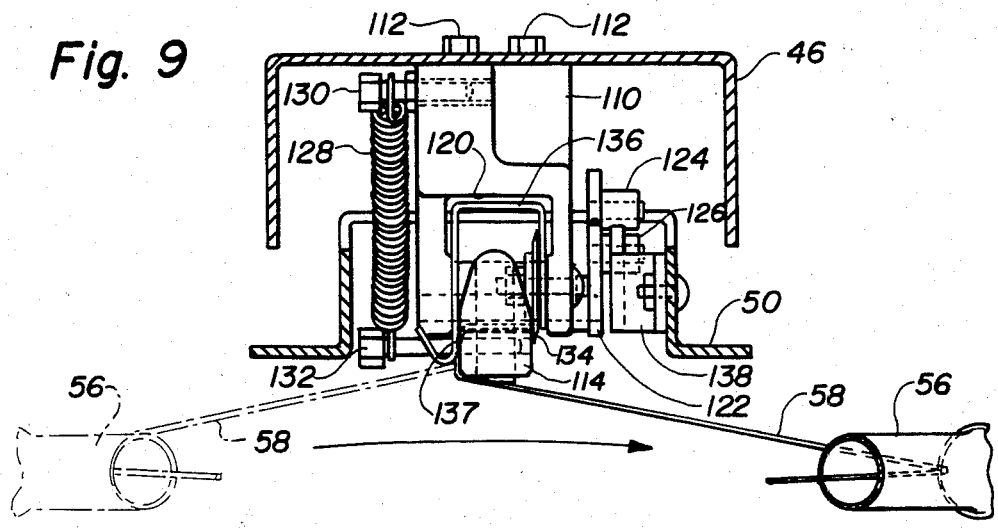
FIG. 9 is an enlarged sectional view taken on lines 9—9 of FIG. 3.
Figure 10:
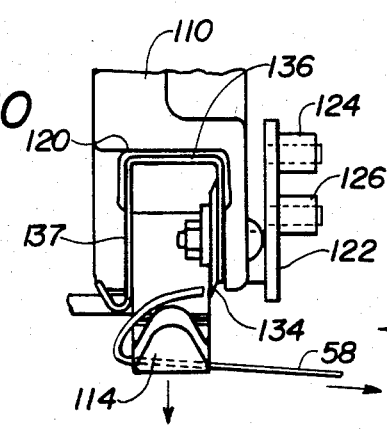
FIGS. 10-13 are schematic views of the mechanism shown in FIGS. 6-9.
Figure 11:
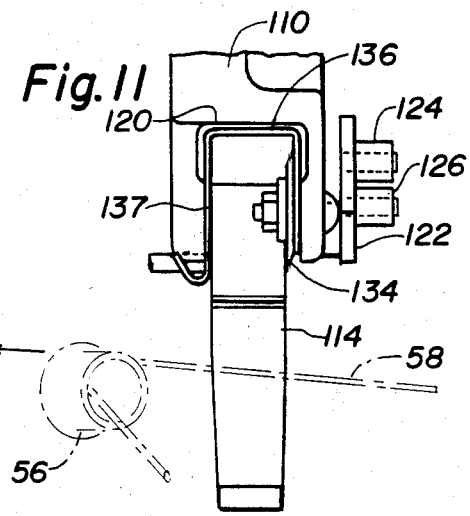
Figure 12:
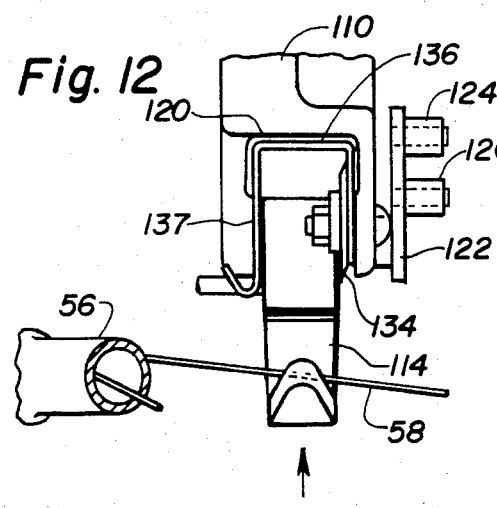
Figure 13:
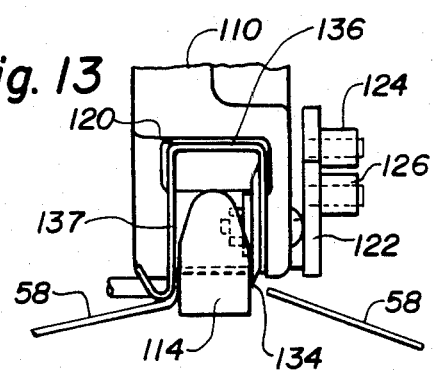

The twine cutting and clamping operation of the cut and clamp mechanism 62 will be best understood by referring to FIGS. 9–13. As seen in FIG. 9, the strands of twine 58 are each initially clamped between an edge of one of the arms 114 and the resilient leg 137 of one of the spring clips 136 when the arms 114 are in their closed positions. As the arms 114 move toward their partially open positions, as shown in FIG. 10, the strands of twine 58 are released. The strands of twine 58 remain released as the arms 114 move to their fully open position shown in FIG. 11 and also as the arms 114 move back toward their closed position as shown in FIG. 12. As the arms 114 are snapped back into their closed positions by the springs 128, as shown in FIG. 13, each strand of twine 58 is cut by a rapid shearing or scissors type action between an edge of one of the arms 114 and the cutting edge of one of the knives 134 while being simultaneously clamped between the other edge of the arm 114 and the resilient leg 137 of the spring clip 136.

During the formation of a roll bale in the machine of FIG. 1, the twine tubes 56 are disposed in their home or rest positions shown in full lines in FIG. 2 and the arms 114 are in their closed positions so that the strands of twine 58 are clamped in the cut and clamp mechanism 62. When the roll bale has been completed and it is desired to wrap the bale with twine, the linear actuator 94 is extended thereby moving the shuttle member 50 toward the sidewall 11a of the base frame 10. This movement of the shuttle member 50 causes the twine tubes 56 to be pivoted, due to the gear racks 86 and the pinions 68, toward the positions indicated in phantom at 56′ in FIG. 2 while the strands of twine 58 remain clamped in the cut and clamp mechanism 62. By clamping the strands of twine 58 in the cut and clamp mechanism 62 while the twine tubes 56 are moved from their home positions to their phantom positions 56′, relatively long twine tails are generated on the strands of twine 58. Further movement of the shuttle member 50 toward the sidewall 11a of the base frame 10 causes the twine tubes 56 to be pivoted to their dispensing positions shown in phantom at 56″ in FIG. 2. As the twine tubes 56 move from the phantom positions 56′ to their dispensing positions 56″, the arms 114 are moved from their closed positions to their fully open positions 114″ and the strands of twine 58 are released from the cut and clamp mechanism 62. The twine tails are fed into the bale chamber in order to be caught between the floor roller 22 and the rotating bale. The linear actuator 94 is then contracted to move the shuttle member 50 back toward the sidewall 11b of the base frame 10 and thereby pivot the twine tubes 56 from their dispensing positions 56″ back toward their home positions shown in full lines in FIG. 2. During this pivoting movement of the twine tubes 56, twine is wrapped around the bale in a spiral manner. As the twine tubes 56 reach their home positions, the arms 114 are snapped back to their closed positions by the springs 128 and the strands of twine 58 are simultaneously cut and clamped in the cut and clamp mechanism 62. The wrapped bale is then discharged from the machine by pivoting the rear frame 14 upwardly in a known manner. The twine wrapping apparatus 42 is ready to wrap the next bale with twine.

It will be understood that the linear actuator 94 may be in the form of an electric servomotor or a hydraulic piston and cylinder unit. Furthermore, the linear actuator 94 may take the form of a manual device such as a threaded rod.

It will also be understood that although the preferred embodiment of the twine wrapping apparatus employs two twine tubes 56, the twine wrapping apparatus may employ only one twine tube or any other number of twine tubes. Accordingly, it will be further understood that the cut and clamp mechanism 62 may consist of only one arm 114, or that more than one cut and clamp mechanism 62 may be used.

The following claims are intended to cover all modifications and variations of the preferred embodiments of the invention without departing from the spirit and scope of the invention.

Having thus described the invention, what is claimed is:

1. In a roll baling machine having a base frame, means for wrapping a roll bale with twine, and a mechanism to cut and clamp said twine, said mechanism comprising:

first and second arms each having one edge adapted for cutting twine and another edge adapted for clamping twine;

first and second spur gears connected to said first and second arms, respectively; and said first and second spur gears being in intermeshing engagement with each other.

2. The mechanism of claim 1, further comprising a lever connected to said first arm for pivoting said first arm, said first and second spur gears causing concurrent pivoting of said second arm when said first arm is pivoted by said lever.

3. The mechanism of claim 2, wherein said lever carries first and second rollers, and further comprising a cam member having first and second cam surfaces arranged for engaging said first and second rollers, respectively, to move said arms between closed and open positions.

4. The mechanism of claim 3, further comprising springs connected to said arms to urge said arms into said closed and open positions.

5. The mechanism of claim 3, wherein said cam member is carried on a shuttle member which is movable generally transversely of said base frame.

* * * * *